United States Patent [19]
Taft

[11] 3,818,944
[45] June 25, 1974

[54] CONTROL VALVES FOR VEHICLES

[75] Inventor: Philip Augustus Taft, Solihull, England

[73] Assignee: Girling Limited, Birmingham, England

[22] Filed: Feb. 25, 1972

[21] Appl. No.: 229,319

[30] Foreign Application Priority Data
Mar. 5, 1971  Great Britain...................... 6146/71
June 25, 1971  Great Britain................... 29826/71

[52] U.S. Cl.................. 137/627.5, 60/547, 251/51, 303/50, 303/52
[51] Int. Cl............................................. B60t 15/04
[58] Field of Search ............ 137/85, 627.5; 251/51; 303/50, 52, 53, 54, 56

[56] References Cited
UNITED STATES PATENTS
1,613,021 1/1927 Christianson........................ 303/54
2,286,282 6/1942 Joesting............................ 303/54 X
2,301,321 11/1942 Price.................................... 303/54
2,947,530 8/1960 Davis........................... 137/627.5 X
2,971,799 2/1961 Knecht................................ 303/54
3,052,254 9/1962 Parks.................................. 137/85
3,097,665 7/1963 Gauldie............................ 251/51 X

*Primary Examiner*—Robert G. Nilson
*Attorney, Agent, or Firm*—Imirie and Smiley; Dwight H. Smiley

[57] ABSTRACT

A control valve assembly for an hydraulic braking system comprising a positively actuated piston working in a longitudinal bore in a cylinder body. A first valve controls communication between a first inlet passage in the body and a first chamber defined by the bore, and a second valve controls communication between second inlet passage in the body, and a second chamber defined by the bore and spaced axially from the first chamber. Operation of the first valve is controlled directly by the piston, and operation of the second valve is controlled indirectly by the piston through at least one longitudinally extending push-rod.

11 Claims, 4 Drawing Figures

CONTROL VALVES FOR VEHICLES

This invention relates to a new or improved control valve assembly for use in hydraulic braking systems of the kind in which a positively actuated piston working in a longitudinal bore in a cylinder body is adapted to control operation of a first normally closed valve for controlling communication between a first passage in the body, for connection to a source of high pressure fluid, and an outlet port in the body, for connection to an hydraulic actuator of a wheel brake, and a second normally open valve for controlling communication between a second passage in the body, for connection to a reservoir for the source of high pressure fluid, and the outlet port, a forward movement in the piston in the bore being operative to close the second valve and open the first whereby high pressure fluid under pressure is adapted to be supplied to the hydraulic actuator.

In one known type of control valve of the kind set forth the valves comrpise spring-loaded valves of the tilting type incorporating stems which project into the longitudinal bore into the path of an actuating member, conveniently a piston working in the bore, which is adapted to engage alternatively with the stems to urge that valve into a tilted open position against its spring-loading. The actuating member has to be moved through a substantial distance after it has engaged a stem in order to tilt that valve into an open position.

In another known type of control valve of the kind set forth each valve is of "poppet" construction and a substantial area of a valve is exposed to high pressure fluid when that valve is opened. This in turn, applies to a foot pedal a reaction force which is of a magnitude greater than that which an operator's foot is able to withstand.

According to our invention in a control valve assembly of the kind set forth one of the valves controls communication between one of the passages and a first chamber defined by the cylinder bore in which the piston works and the other valve controls communication between the other passage and a second chamber in the housing which is spaced axially from, and is in free communication at all times with, the first chamber, operation of the said one valve being controlled directly by the piston, and operation of the said other valve being controlled indirectly by the piston through at least one longitudinally extending push-rod.

The operation of the control valve assembly is highly sensitive and the valves can be opened and closed in response to a minimum longitudinal movement of the piston.

Furthermore, the reaction of the high pressure fluid in the positively adjusted piston is reduced to a minimum by reducing to a minimum the diameters of the first and second valve which are axially spaced and are oppositely acting.

Preferably the valve comprises longitudinally extending spring-loaded members for engagement with opposed seatings located in a portion of the cylinder body which separates the chambers from each other.

Conveniently each valve member works in a longitudinal bore in a valve seating member which is housed in a complementary bore in one end of the said portion of the cylinder body, and a clearance is provided between the valve member and the bore of the valve seating member to provide communication between the passage and the chamber between which that valve is located, when the valve member is spaced from its seating.

Communication between the chambers at all times may be provided by a open-ended passage extending longitudinally through the said portion of the cylinder body. Conveniently the push-rod may be guided to slide in the open-ended passage, with a clearance being provided between the open-ended passage and the push-rod.

In a modified construction the second chamber provides communication between the first passage in the body and the outlet port when the first valve is open, and a floating or secondary piston works in a bore portion continuous with the second chamber is a pressure space defined within that bore portion in advance of the end of the floating or secondary piston remote from the positively actuated piston being in communication with an inlet port for connection to a reservoir for fluid through a normally open third valve which is adapted to close when the secondary or floating piston is advanced in its bore portion when subjected to hydraulic fluid under pressure in the second chamber whereby fluid in the pressure space is pressurised and is supplied to a second outlet port in the cylinder body for connection to the same or a different hydraulic actuator of the same or a different wheel brake.

Conveniently the third valve comprises a spring-loaded valve member which is urged into engagement with a seating surrounding the inlet port, which is located in a wall at the end of the cylinder bore remote from the positively actuated piston, when the floating or secondary piston is advanced in the bore portion, and retraction movement of the floating or secondary piston in the opposite direction moves the valve member away from its seating whereby communication between the inlet port and the second outlet port is again established.

In the event of failure of the second chamber the floating secondary piston is advanced in its bore portion when the positively actuated piston is operated by an engagement between the piston of at least one further longitudinally extending push-rod.

Conveniently the said further push-rod is guided to slide through an open-ended passage in the portion of the cylinder body which separates the chambers from each other. Preferably a clearance is provided between that push-rod and the passage.

Two embodiments of our invention as illustrated in the accompanying drawings in which.

Figure 1:
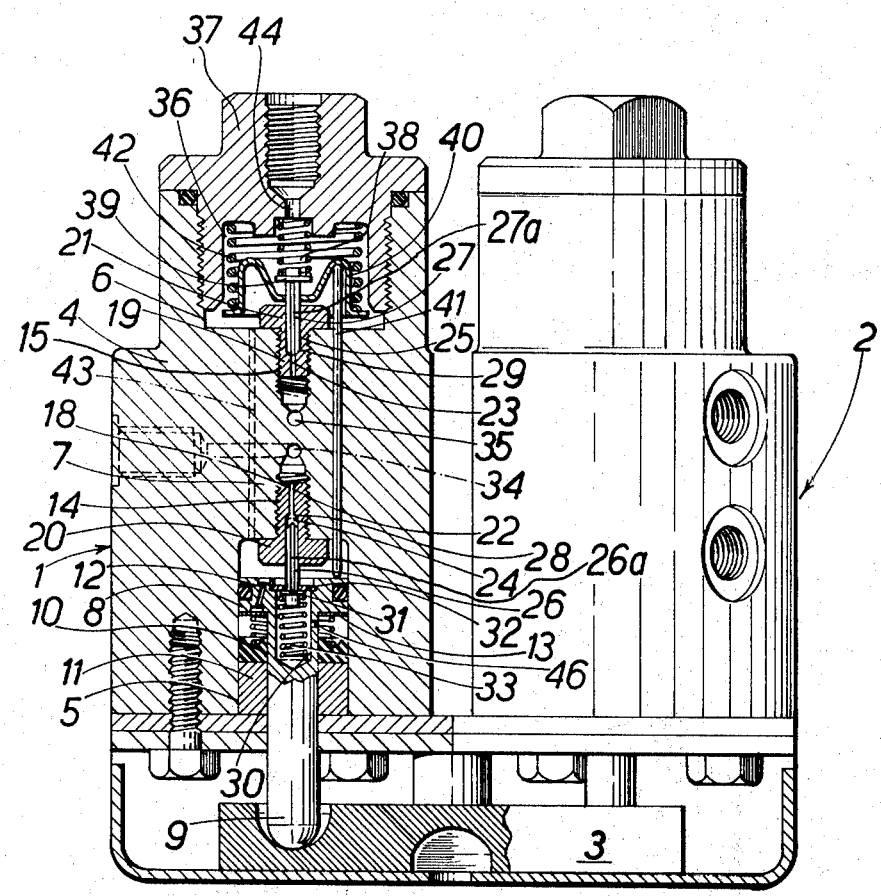
FIG. 1 is a plan of a dual control valve assembly for use in an hydraulic braking system including a longitudinal section through one control valve assembly.
Figure 2:
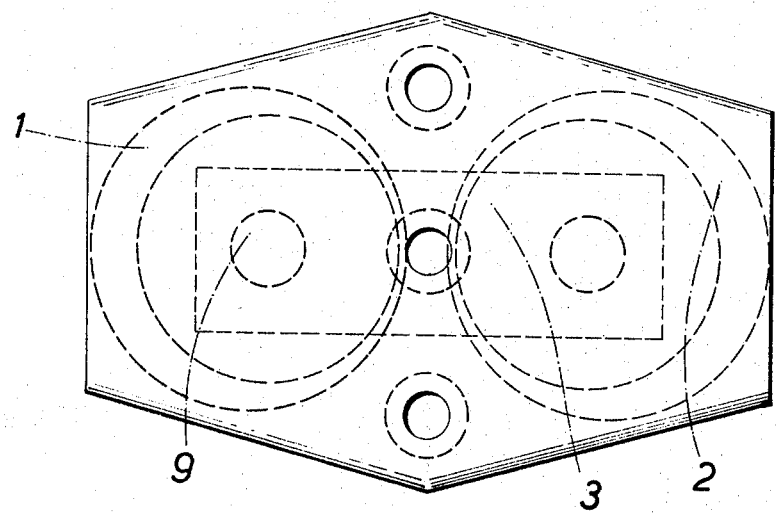
FIG. 2 is an end elevation of the dual control valve assembly illustrated in FIG. 1.

In the dual control valve assembly illustrated in FIGS. 1 and 2 of the drawings a control valve assembly 1 and a control valve assembly 2 are combined together and are actuated by a common balance-bar 3 from a pedal (not shown) which acts on the balance-bar at an intermediate point in its length.

The control valve assembly 1 comprises a body 4 provided at opposite ends with separate concentric inwardly extending longitudinal bores 5 and 6 separated at adjacent ends by a body portion 7.

A piston 8 working in the bore 5, which is of a diameter smaller than that of the bore 6, is carried by the inner end of a piston-rod 9 which works through a seal 10 and a central opening in a closure 11 for the other end of the bore 5 and which is engaged at its outer free end by the balance-bar 3. A substantially axial bleed passage 12 extends through the piston to equalise pressures in chambers on opposite sides of the piston 8 and defined by the bore 5. Flow through the passage 12 is controlled by a spring-loaded valve member in the form of a plate 13.

A pair of axial bores 14 and 15 concentric with the bores 5 and 6 extend inwardly towards each other from opposite ends of the body portion 7, and the bores 14 and 15 are each screw-threaded laterally to receive a threaded stem 18, 19 of a headed valve seating member 20, 21 respectively. The valve seating members 20, 21 are formed with longitudinally extending bores 22, 23 respectively. The members 20 and 21 are counterbored at 24 and 25 from their headed ends to form guides for a pair of oppositely acting valve members 26 and 27 in the form of needles having conical inner ends for engagement with complementary seatings 28 and 29 located in the valve seating members 20 and 21 at steps in diameter between the bores 22 and 23 and the counterbores 24 and 25.

The outer end of the needle 26 is received in an axially extending recess 30 in the adjacent end of the piston 8 and piston-rod 9 carries a radial collar 31 which is normally urged into engagement with a stop 32 at the end of the piston 8 remote from the piston-rod 9 by means of a compression spring 33. The needle 26 is provided with a pair of diametrically opposed flats or longitudinal recesses or grooves 26a so that, in the position shown in the drawings in which the needle 26 is retracted from the seating 28, the chamber 5 is in communication with a radial passage 34 at the inner end of the bore 14 through clearances between the needle 26 and the bore 14. In this position the other needle 27, which is also provided with a pair of diametrically opposed flats or longitudinal recesses or grooves 27a, engages with its seating 29 to cut-off communication between a radial passage 35 at the inner end of the bore 15 and a chamber 36 defined within the bore 6 between the body portion 7 and the inner end of a plug 37 which is screwed into the outer-open end of the bore 6. The needle 27 is urged into engagement with the seating 28 by the effect of a compression spring 38 acting on a radial abutment collar 39 on the needle 27. The needle 27 is guided through a central opening in a generally cup-shaped member 40 which provides an abutment for the outer ends of three push-rods 41 working through longitudinal bores in the body portion 7 and engaging at their opposite ends with the piston 8. The bores in which the push-rods 41 work are equi-shaped angularly on a pitch circle of constant diameter concentric with the axes of the bores 5 and 6 and the needles 25 and 26. A compression return spring 42 acting on the push-rods 41 through the member 40 is operative to hold the piston 7 in an inoperative retracted position 4 in which the valve member 27 engages with its seating 29. and the valve member 26 is spaced from its seating 28. In this position there is a substantial axial clearance between the collar 39 and the member 40.

The chambers defined by the bore 5 and the chamber 36 are in open communication at all times through clearances between the push-rods 41 and the bores in which they work. In addition a further longitudinal bore 43 may be provided in the body portion 7 to augment communication between the chambers.

The construction of the valve assembly 2 is the same as the valve assembly 1.

When the dual valve assembly 1 and 2 is incorporated in an hydraulic braking system of a vehicle the radial passage 35 is connected to a source of high pressure hydraulic fluid, conveniently a high pressure pump or hydraulic accumulator, and the radial passage 34 is connected to a reservoir for the source. The chamber 36 is connected to an hydraulic actuator of a wheel brake through an axial outlet port 44 in the plug 37. Similarly corresponding passages in the valve assembly 2 are also connected to the source of high pressure fluid to the reservoir. The outlet port from the valve assembly 2 may be connected to the same or a different hydraulic actuator of the wheel brake or to an hydraulic actuator of another wheel brake.

When the pedal is operated, the pistons 8 are advanced simultaneously in their bores. Initial movement of the pistons 8 causes the needles 26 to engage with their seatings 28 to isolate the reservoir from the chambers defined by the bores 5, and to act on the members 40 through the push-rods 41 to compress the compression springs 42 and take up part of the clearances between the members 40 and the abutment collars 39. Further movement of the pistons 8 in the same direction takes place relative to the needles 26 to compress the compression springs 33, and take up the remainder of the clearances between the members 40 and the collars 39 until the needles 27 are moved away from the seatings 29 by engagements between the members 40 and the collars 39. High pressure fluid from the source enters the chambers 36 and is delivered to the hydraulic actuator or actuators through the outlet ports 44. The high pressure fluid also acts on the piston 8 through the bores in which the push-rods 41 work and the bores 43, and the bleed passage 12 serves to equalise the pressures on opposite sides of the pistons 8.

When the pedal is released, each return spring 42 restores the valve assembly 1, 2 to its inoperative position as shown in the drawings, and high pressure fluid trapped between the chamber and the brake actuated is returned to the reservoir through the longitudinal bores in the body portion 7 and the clearance between the needle 26 and the bore 24 in which it works. However, due to the provision of the plate 13 there is a tendency for fluid to become trapped in the portions of the bores 5, behind the pistons 8. A radial passage 46 is thus provided in the wall of each recess 30 so that the fluid can enter the recess 30, of which the effective volume increases upon withdrawal of the needle 26. The provision of the bleed passages 12 and the passages 46 have the advantage of providing the dual control valve assembly with smooth operational characteristics.

Figure 4:
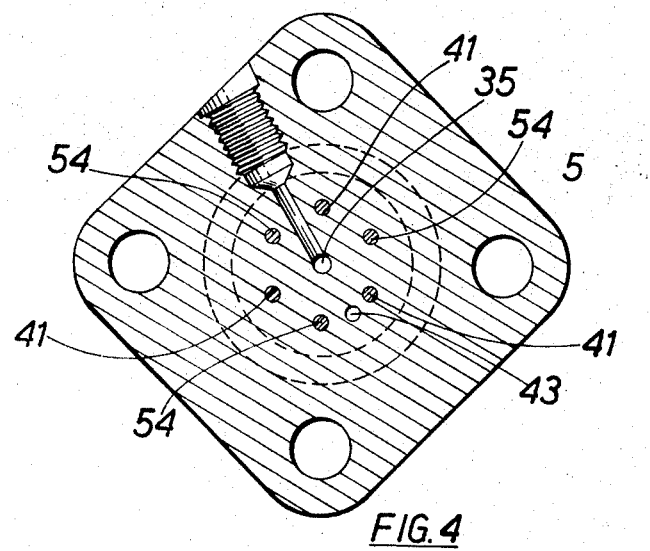
FIG. 4 is a section on the line 4—4 of FIG. 3.
Figure 3:
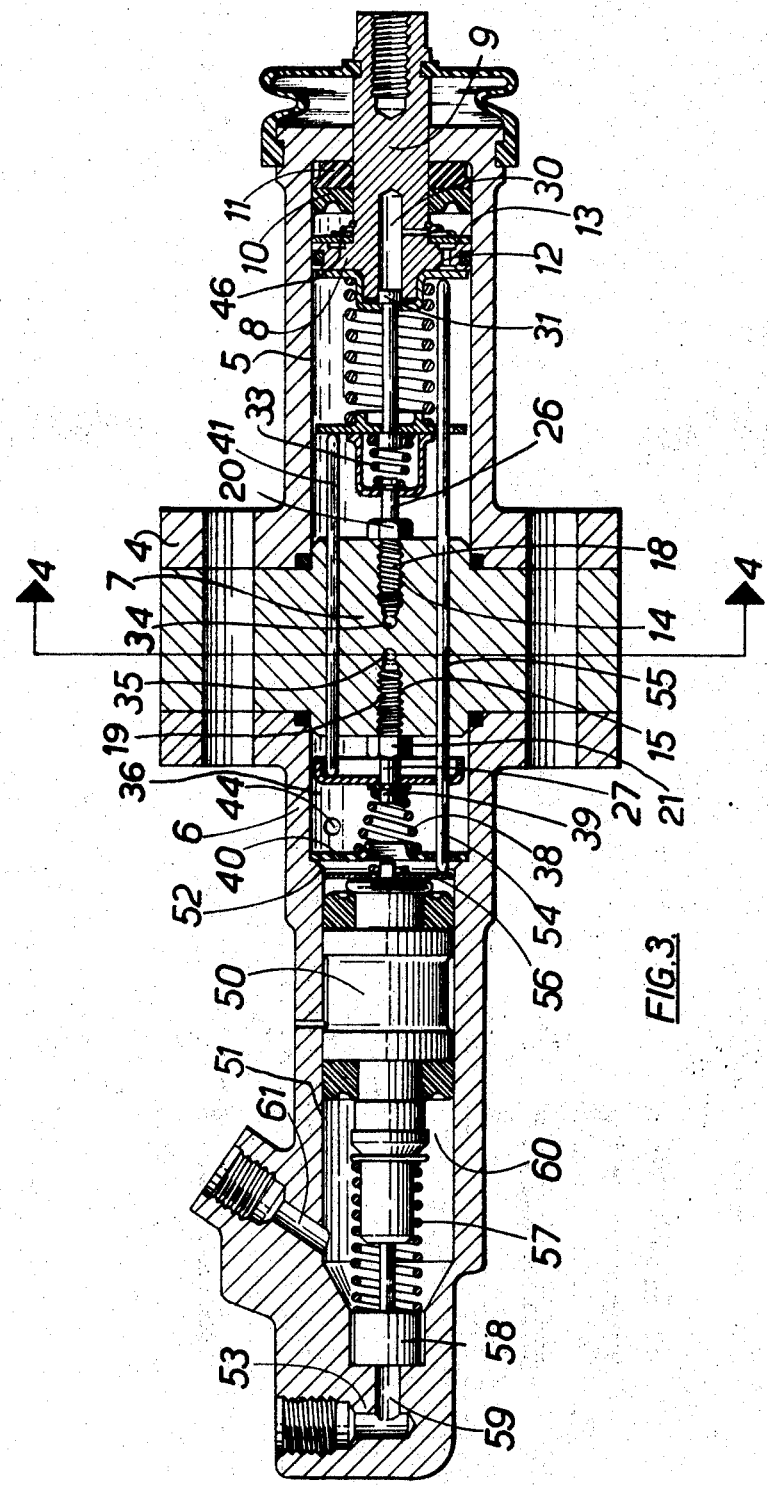
FIG. 3 is a longitudinal section through a tandem hydraulic control valve assembly for use in an hydraulic braking system.

The tandem control valve assembly illustrated in FIGS. 3 and 4 of the drawings is similar in construction to one of the control valve assemblies 1 and 2 described above with reference to FIGS. 1 and 2 of the drawings.

Accordingly that part of the valve which has already been described above will not be described herein but corresponding reference numerals have been applied to corresponding parts.

In the tandem hydraulic control valve illustrated in the accompanying drawings the cylinder body 4 is extended in length. The chamber 36 is defined within the bore 6 between the body portion 7 and the inner adjacent end of a floating or secondary piston 50 which works in a portion 51 of reduced diameter of the bore 6 defined between a shoulder 52 at a step in diameter and forming an abutment for the member 40 and an inner end wall 53 of the cylinder body 4.

Three push-rods 54 working through open-ended clearance passages 55 in the body portion 7 are equally spaced angularly on a pitch circle of constant diameter. The push-rods 54 define a retracted position of the piston 50 by engagement of their opposite ends between a plate 56 carried by the piston 50 and the piston 8 under the influence of a helical return spring 57 acting between the end wall 53 and an adjacent end of the piston 50. In that retracted position an axially extending valve member 58 coupled to the outer end of the piston 50 is spaced from a port 59 in the end wall 53 for connection to a reservoir for hydraulic fluid. Thus the reservoir is in free communication with a pressure space 60 defined in the bore 51 between the piston 50 and the end wall 53. A second outlet port 61 in the cylinder body, for connection to an hydraulic actuator of a wheel brake, communicates with the pressure space 60 so that normally the reservoir and the actuator are in free communication.

When the positively actuated piston 8 is advanced in the bore 6 high pressure fluid enters the chamber 36 and is delivered through the outlet port 44 to an hydraulic actuator of a wheel brake as described above with reference to FIGS. 1 and 2. Simultaneously the high pressure fluid in the chambers 35 acts on the piston 50 to advance it in the bore portion 51. Initial movement of the piston 50 causes the valve member 58 to engage with its seating thereby isolating the pressure space 60 from the reservoir. Subsequent further movement of the piston in the same direction presurises hydraulic fluid in the pressure space 60 which is supplied to an actuator of a wheel brake through the outlet port 61.

Failure of the chamber 44 or the brake circuit to which that chamber is connected prevents the secondary or floating piston 50 from being advanced in the bore portion 51 as described above. However, due to the provision of the push-rods 54, when the piston 8 is operated, the piston 50 is advanced in the bore portion 51 between the piston 50 and 8. Thus fluid under pressure can still be supplied to the brake actuator from the pressure space 60.

The outlet ports 44 and 61 may be connected to actuators of the same or different brakes of a vehicle. For example the port 44 may be connected to the actuators of brakes on the front wheels of a vehicle, and the port 61 may be connected to the actuators of brakes on the rear wheels of a vehicle.

I claim:

1. In a control valve assembly for an hydraulic braking system comprising a cylinder body having first and second axially spaced chambers, first and second passages, and an outlet port communicating with said first chamber, a body portion between said chambers, means in said body portion for maintaining said chambers in free communication at all times, a first valve for controlling communication between said first passage and said first chamber and movable between a normally closed position and an open position, a second valve for controlling communication between said second passage and said second chamber and movable between a normally open position and a closed position, said second chamber defining a piston bore, and a piston working in said piston bore, the invention wherein each of said valves comprises one of a pair of co-axial needle bores in said body portion at the inner ends of said chamber, said needle bores having a common axis with said piston bore, and each needle bore communicating with a corresponding one of said first and second passages, a seating in each needle bore, a longitudinally extending elongate spring-loaded needle valve member working in each needle bore and having a free end for engagement with said seating, at least one push-rod spaced radially from said common axis of said piston and needle bores and extending longitudinally through said body portion, said piston acting on one valve through said push-rod to control indirectly the operation thereof, operation of the other valve being controlled directly by said piston, the arrangement being such that a forward movement of said piston in said piston bore is operative to cause said valve member of said second valve to engage with its seating to cut-off communication between said second passage and said second chamber, further movement of said piston in the same direction being operative to urge said valve member of said first valve out of engagement with its seating to place said first passage in communication with said first chamber.

2. The invention as claimed in claim 1, wherein said body portion is provided with an open-ended longitudinally extending passage.

3. The invention as claimed in claim 2, including means defining a clearance between said push-rod and said open-ended longitudinally extending passage provides communication at all times between said first and second chambers.

4. The invention as claimed in claim 2, incorporating a further open-ended passage extending longitudinally through the said body portion to provide communication at all times between said first and second chambers.

5. The invention as claimed in claim 1, incorporating a plurality of longitudinally extending push-rods through which said piston acts on said other valve.

6. The invention as claimed in claim 5, wherein said push-rod acts between said piston and an abutment member located within said second chamber and through which projects said needle valve member of said first valve, and an enlargement at the end of the said needle valve member is normally spaced from said abutment member but is engaged thereby to open said first valve after said second valve has been closed by said forward movement of said piston.

7. The invention as claimed in claim 1, wherein each valve member works in a longitudinal bore in a valve seating member which is housed in a complementary bore in one end of said body portion, and means are provided for defining a clearance between said valve member and a bore of said valve seating member to provide communication between said passage and said chamber between which that valve is located, when said valve member is spaced from its seating.

8. The invention as claimed in claim 1, wherein a bleed passage extends through said piston to equalise pressures in said chambers in said bore on opposite sides of said piston.

9. The invention as claimed in claim 8, incorporating a spring-loaded valve member for controlling flow through said bleed passage.

10. The invention as claimed in claim 9, wherein said spring-loaded valve member comprises a plate.

11. In a dual control valve assembly for an hydraulic braking system comprising first and second control valve assemblies, each control valve assembly comprises a cylinder body having first and second axially spaced chambers, first and second passages, and an outlet port communicating with said first chamber, a body portion between said chambers, means in said body portion for maintaining said chambers in free communication at all times, a first valve for controlling communication between said first passage and said first chamber and movable between a normally closed position and an open position, a second valve for controlling communication between said second passage and said second chamber and movable between a normally open position and a closed position, said second chamber defining a piston bore, and a piston working in said piston bore, the invention wherein each of said valves comprises one of a pair of co-axial needle bores in said body portion at the inner ends of said chambers, said needle bores having a common axis with said piston bore, and each needle bore communicating with a corresponding one of said first and second passages, a seating in each needle bore, a longitudinally extending elongate spring-loaded needle valve member working in each needle bore and having a free end for engagement with said seating, at least one push-rod spaced radially from said common axis of said piston and needle bores and extending longitudinally through said bore portion, said piston acting on one valve through said push-rod to control indirectly the operation thereof, operation of the other valve being controlled directly by said piston, a common balance bar for operating said pistons simultaneously, the arrangement being such that a forward movement of said pistons in said piston bores in response to operation of said balance bar is operative to cause said valve members of said second valves to engage with their seatings to cut-off communication between said second passages and said second chambers, further movement of said pistons in the same direction being operative to urge said valve members of said first valves out of engagement with their seatings to place said first passages in communication with said first chambers.

* * * * *